United States Patent [19]

Weldy

[11] 4,268,637

[45] May 19, 1981

[54] ELIMINATION OF BLOOM IN [VUL-CUP] PEROXIDE CROSSLINKED ELASTOMER COMPOUNDS

[75] Inventor: Winfred E. Weldy, Wilmington, Del.

[73] Assignee: Hercules Incorporated, Wilmington, Del.

[21] Appl. No.: 46,525

[22] Filed: Jun. 7, 1979

[51] Int. Cl.³ .................. C08L 23/16; C08J 23/04; C08K 5/09; C08K 5/14
[52] U.S. Cl. ................................ 525/105; 252/186; 525/106; 525/333; 525/386; 525/387
[58] Field of Search ............... 525/106, 105, 333, 386; 252/186

[56] References Cited

U.S. PATENT DOCUMENTS

| | | | |
|---|---|---|---|
| 2,427,514 | 9/1947 | Sterrett et al. | 525/386 |
| 3,317,454 | 5/1967 | Pedretti | 260/33.4 PO |
| 3,338,839 | 8/1967 | MacKellar et al. | 252/186 |
| 3,425,983 | 2/1969 | Wolfe | 525/106 |
| 3,644,592 | 2/1972 | Gilbert | 525/6 |
| 4,008,175 | 2/1977 | Barter | 252/426 |

OTHER PUBLICATIONS

Chemical Abstracts, vol. 86 #86:91452p.

*Primary Examiner*—Wilbert J. Briggs, Sr.

[57] ABSTRACT

Disclosed are nonblooming, crosslinkable compositions comprising crosslinkable elastomer, a peroxide crosslinker selected from $\alpha,\alpha'$-bis(t-butylperoxy) meta-diisopropylbenzene, $\alpha,\alpha'$-bis(t-butylperoxy) para-diisopropylbenzene and mixtures thereof, and phthalic anhydride.

8 Claims, No Drawings

ELIMINATION OF BLOOM IN [VUL-CUP] PEROXIDE CROSSLINKED ELASTOMER COMPOUNDS

BACKGROUND OF THE INVENTION

It is known that α,α'-bis(t-butylperoxy) diisopropylbenzene having the formula:

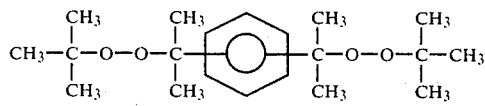

may be used as a crosslinking agent for a variety of polymers including low and high density polyethylene, ethylenepropylene copolymer, ethylene-propylene terpolymer rubber, natural rubber, butadiene-styrene rubber, polybutadiene, polyisoprene, polychloroprene, sulfochlorinated polyethylene, chlorinated polyethylene, silicone rubbers, and blends of these polymers or blends with other polymers. This peroxide is particularly effective as a crosslinking agent for ethylene-propylene terpolymer rubbers and blends of ethylene-propylene terpolymer rubbers with silicone rubbers.

While α,α'-bis(t-butylperoxy) diisopropylbenzene is an effective crosslinking agent for the polymers listed above, the resulting crosslinked product may be subject to blooming. Blooming is the migration to the surface of the cross-linked product of white, normally crystalline materials which causes nonuniform coloration in crosslinked articles, particularly in those which are dark colored due to the presence of fillers, pigments or dyes.

SUMMARY OF THE INVENTION

This invention is directed to a method for prevention of blooming in polymers crosslinked by α,α'-bis(t-butylperoxy) diisopropylbenzene. In particular, it is directed to novel compositions comprising a polymer crosslinkable by a peroxide, having incorporated therein a crosslinking amount of α,α'-bis(t-butylperoxy) diisopropylbenzene and an antiblooming agent, phthalic anhydride. It is further directed to compositions comprising a mixture of the peroxide crosslinker, α,α'-bis(t-butylperoxy) diisopropylbenzene, and the antiblooming agent, phthalic anhydride which mixture may be supported on an inorganic particulate carrier.

DETAILED DESCRIPTION OF THE INVENTION

This invention is concerned with a method of preventing undesirable blooming on the surface of articles prepared by crosslinking polymers with α,α'-bis(t-butylperoxy) diisopropylbenzene. This blooming is believed to be due principally to migration of crystalline bis(dimethylhydroxymethyl)benzene, a by-product of the crosslinking reaction, to the surface of the crosslinked article. In accordance with this invention, it has been discovered that when a quantity of phthalic anhydride at least approximately twice the stoichiometrical equivalent to the amount of peroxide present is included in the uncrosslinked composition, i.e., two moles of phthalic anhydride for each mole of peroxide, blooming does not occur in the crosslinked article. While not intending to be bound by any theory, it is thought that the phthalic anhydride reacts with the crystalline bis(dimethylhydroxymethyl)benzene during the crosslinking reaction, resulting in the formation of a material which is noncrystalline and which does not migrate to the surface of the crosslinked polymer.

U.S. Pat. No. 3,317,454 to Pedretti discloses the use of various materials as antiblooming agents to suppress blooming in ethylene copolymers which have been crosslinked with α,α'-bis(t-butylperoxy) diisopropylbenzene. Included among these materials are polyalcohols, polyalkylene oxides, and mixtures of polyalcohols with silicic acid, an alkylene glycol or polyalkylene oxide. There is, however, no teaching nor suggestion of the use of an anhydride to prevent blooming.

The peroxide employed in this invention is α,α'-bis-(t-butylperoxy) diisopropylbenzene. The meta or para isomers may be used, as well as mixtures of the two isomers. This peroxide is a very effective crosslinking agent for saturated and unsaturated hydrocarbon polymers. It is used at concentrations of about 0.1% to about 6%, preferably about 0.5% to about 3%, by weight based on the weight of the polymer, the quantity employed depending on the ease of crosslinking of the polymer being treated. This peroxide is effective at crosslinking temperatures of about 150° C. to about 200° C., preferably about 170° C. to about 180° C. The time of crosslinking may vary from a few seconds to several hours, depending on the temperature and the polymer employed.

As stated above, the peroxide may be used in the form of its para isomer, meta isomer, or mixture of the meta and para isomers. The peroxide may be used neat; as a solution in a suitable solvent; as a blend with a polymer or solubilizing resin; or as a concentrate deposited on an inorganic particulate carrier, clay and carbon black being preferred. If an inorganic particulate carrier is employed, it will constitute from about 50% to about 90% by weight, preferably about 50% to about 70% by weight, of the peroxide-carrier composition.

The crosslinkable polymers and polymer blends useful in this invention include ethylene-propylene terpolymer rubbers and blends of such rubbers with silicone rubbers (also known as polysiloxanes), which blends contain about 20% to about 100% by weight based on the weight of blend of ethylene-propylene terpolymer rubber. The eythylene-propylene terpolymer rubbers (also known as EPDM rubbers) are commercially available elastomeric copolymers containing about 40-70% ethylene units, up to about 5% of unconjugated diolefin units with the remainder being propylene units. The diolefinics normally employed are dicyclopentadiene, methylenenorbornene and 1,4-hexadiene.

This invention is particularly useful with polymer compositions containing dark colored dyes or fillers such as carbon black, iron oxide, lead chromate, and organic pigments since the undesirable blooming is more apparent on the surface of such dark colored materials.

The amount of phthalic anhydride needed to suppress blooming is about 2.0 to about 6.0, preferably about 3.0 to about 5.0 moles of anhydride per mole of peroxide employed, or, expressed on a weight basis, from about 88 to about 260, preferably from about 130 to about 220 parts by weight of anhydride per 100 parts by weight peroxide.

If desired, polyunsaturated curing coagents, such as trimethylolpropane trimethacrylate, which are employed to increase the level of crosslinking in peroxide-cured systems may be added to the crosslinkable composition. In addition, other additives normally present in polymer compositions, such as antioxidants, antiozonants, light stabilizers and plasticizers, may also be present, provided they do not interfere with the function of the peroxide.

The compositions of this invention may be prepared by any of the known methods for compounding additives with polymers or rubbers. Preferred methods are by use of a two roll mill or a Banbury mixer. Care should be exercised in keeping the mixing temperature below 120° C. so as to avoid decomposition of the peroxide during compounding.

EXAMPLE 1

The following formulations were prepared by blending on a two roll mill at a temperature of 60°-65° C. for 10 minutes.

| Ingredients | Parts by Weight | |
|---|---|---|
| | Formulation A | Formulation B |
| EPDM Rubber (Vistalon 2504, Enjay Co.) | 100 | 100 |
| Zinc Oxide | 5 | 5 |
| Age-Rite Resin D, R. T. Vanderbilt Co. (antioxidant) | 1.5 | 1.5 |
| FEF Carbon Black | 40 | 40 |
| Trimethyolpropane trimethacrylate curing coagent | 1.5 | 1.5 |
| α,α'-bis(t-butylperoxy) diisopropylbenzene on clay support (40% by weight peroxide; meta/para isomer ratio about 2.0/1) | 3.8 | 3.8 |
| Phthalic anhydride | — | 1.33 |

Both formulations were cured into sheets 0.075 inch thick by heating in a compression press for 20 minutes at 177° C. The sheets were stored at room temperature and blooming was observed as indicated below.

| | Formulation A | Formulation B |
|---|---|---|
| After 2 days | Slight | None |
| After 10 days | Very much | None |
| After 30 days | Very much | None |

EXAMPLE 2

The following formulations were prepared by blending on a two roll mill at a temperature of 60°-65° C. for 10 minutes.

| Ingredients | Parts by Weight | |
|---|---|---|
| | Formulation C | Formulation D |
| Blend of EPDM rubber (Nordel 1320, DuPont) and vinyl modified silicone rubber (SWS 727, SWS Silicones Corp. (25% EPDM rubber, 75% vinyl modified silicone rubber) | 100 | 100 |
| Magnesium oxide | 5 | 5 |
| α,α'-(t-butylperoxy) diisopropylbenzene on clay support (40% by weight peroxide; meta/para isomer ratio about 2.0/1) | 1.8 | 1.8 |
| Phthalic anhydride | — | 0.6 |

Both formulations were cured into sheets 0.075 inch thick by heating in a compression press for 15 minutes at 177° C. The sheets were stored at room temperature and blooming was observed as indicated below.

| | Formulation C | Formulation D |
|---|---|---|
| After 5 days | Slight | None |
| After 30 days | Very much | None |

EXAMPLE 3

Formulations the same as those shown in Example 1 were prepared according to the procedure in Example 1 except that the peroxide was used in unsupported form rather than supported on clay.

| Ingredients | Parts by Weight | |
|---|---|---|
| | Formulation E | Formulation F |
| EPDM Rubber (Vistalon 2504, Enjay Co.) | 100 | 100 |
| Zinc Oxide | 5 | 5 |
| Age-Rite Resin D, R. T. Vanderbilt Co. (antioxidant) | 1.5 | 1.5 |
| FEF Carbon Black | 40 | 40 |
| Trimethyolpropane trimethacrylate curing coagent | 1.5 | 1.5 |
| α,α'-bis(t-butylperoxy) diisopropylbenzene (meta/para isomer ratio about 2.0/1) | 1.52 | 1.52 |
| Phthalic anhydride | — | 1.33 |

The formulations were cured as described in Example 2 and stored at room temperature. Bloom was observed as indicated below.

| | Formulation E | Formulation F |
|---|---|---|
| After 2 days | Slight | None |
| After 30 days | Very much | None |

EXAMPLE 4

The following formulations were prepared by blending on a two-roll mill at 60°-65° C. for 10 minutes.

| Ingredients | Parts by Weight | |
|---|---|---|
| | Formulation G | Formulation H |
| EPDM Rubber (Minnesota Rubber Co. 557N M.B.) | 60 | 60 |
| FEF Carbon Black | 40 | 40 |
| Zinc Oxide | 5 | 5 |
| α,α-bis(t-butylperoxy) diisopropylbenzene on clay support (40% by weight peroxide; meta/para isomer ratio about 2.0/1) | 5.75 | — |
| Peroxide 40 NB (4 parts α,α'-bis(t-butyl peroxy) diisopropylbenzene; 2.5 parts Burgess KE clay; 3.5 parts phthalic anhydride) | — | 5.75 |

Both formulations were cured into sheets 0.075 inch thick by heating in a compression press for 20 minutes at 177° C. The sheets were stored at room temperature and blooming was observed as indicated below.

|  | Formulation G | Formulation H |
| --- | --- | --- |
| After 1 day | Slight | None |
| After 4 days | Moderate | None |
| After 5 days | Moderate | None |
| After 8 days | Very much | None |
| After 11 days | Very much | None |

EXAMPLE 5

The following formulations were prepared by blending on a two-roll mill at a temperature of 60°–65° C. for 10 minutes.

| Ingredients | Parts by Weight | |
| --- | --- | --- |
|  | Formulation I | Formulation J |
| EPOM Rubber (Minnesota Rubber Co. 559N M.B.) | 60 | 60 |
| FEF Carbon Black | 40 | 40 |
| Zinc Oxide | 5 | 5 |
| α,α'-bis(t-butylperoxy) para-diisopropylbenzene | 2.3 | 2.3 |
| Phthalic anhydride | 2.0 | — |

The formulations were cured into sheets 0.075 inch thick by heating in a compression press for 15 minutes at 177° C. The sheets were stored at room temperature and blooming was observed as indicated below.

|  | Formulation I | Formulation J |
| --- | --- | --- |
| After 1 day | None | None |
| After 3 days | None | Slight |
| After 7 days | None | Moderate |
| After 11 days | None | Very much |

EXAMPLE 6

The following formulations were prepared as in Example 5:

| Ingredients | Parts by Weight | |
| --- | --- | --- |
|  | Formulation K | Formulation L |
| EPDM Rubber (Minnesota Rubber Co. 559N M.B.) | 60 | 60 |
| FEF Carbon Black | 40 | 40 |
| Zinc Oxide | 5 | 5 |
| α,α'-bis(t-butylperoxy) meta-diisopropylbenzene | 2.3 | 2.3 |
| Phthalic anhydride | 2.0 | — |

The formulations were cured as in Example 5 and blooming was observed as indicated below.

|  | Formulation K | Formulation L |
| --- | --- | --- |
| After 1 day | None | None |
| After 3 days | None | Moderate |
| After 7 days | None | Moderate |
| After 11 days | None | Very much |

As indicated by Example 4, the peroxide and phthalic anhydride may be admixed prior to addition to the crosslinkable polymer. The amount of peroxide and phthalic anhydride used in the mixture will be the same as when they are added to the polymer separately, i.e., the quantity of phthalic anhydride is at least approximately twice the stoichiometric equivalent to the amount of peroxide used. The mixture may be deposited on an inorganic particulate carrier, clay and carbon black being preferred. When a carrier is used, it will generally comprise about 10% to about 50% by weight, preferably 20% to about 35% by weight, of the peroxide-phthalic anhydride-carrier composition.

What I claim and desire to protect by Letters Patent is:

1. A crosslinkable composition comprising an elastomeric component selected from ethylene-propylene terpolymer rubbers and blends of said rubbers with silicone rubbers; an effective amount of a peroxide selected from α,α'-bis(t-butylperoxy) para-diisopropylbenzene, α,α'-bis(t-butylperoxy) metadiisopropylbenzene and mixtures thereof; and phthalic anhydride, the amount of phthalic anhydride employed being about 2.0 moles to about 6.0 moles per mole of peroxide employed.

2. A composition comprising a peroxide selected from α,α'-bis(t-butylperoxy) meta-diisopropylbenzene, α,α'-bis(t-butylperoxy) para-diisopropylbenzene and mixtures thereof and phthalic anhydride, the amount of phthalic anhydride present in the composition being, by weight, from about 88 parts to about 260 parts per 100 parts peroxide.

3. The composition of claim 2 wherein the peroxide and phthalic anhydride are supported on a carrier.

4. A nonblooming article obtained by crosslinking the crosslinkable composition of claim 1.

5. The composition of claim 1 wherein the amount of phthalic anhydride is from about 3.0 moles to about 5.0 moles per mole of peroxide.

6. The composition of claim 2 wherein the amount of phthalic anhydride is from about 130 parts to about 220 parts per 100 parts peroxide.

7. The composition of claim 6 wherein the peroxide and phthalic anhydride are supported on a carrier.

8. A nonblooming article obtained by crosslinking the crosslinkable composition of claim 5.

* * * * *

UNITED STATES PATENT AND TRADEMARK OFFICE
CERTIFICATE OF CORRECTION

PATENT NO. : 4,268,637
DATED : May 19, 1981
INVENTOR(S) : Winfred E. Weldy

It is certified that error appears in the above-identified patent and that said Letters Patent are hereby corrected as shown below:

The title "ELIMINATION OF BLOOM IN [VUL-CUP] PEROXIDE CROSSLINKED ELASTOMER COMPOUNDS"

should read --ELIMINATION OF BLOOM IN PEROXIDE CROSSLINKED ELASTOMER COMPOUNDS

Signed and Sealed this

Eighteenth Day of August 1981

[SEAL]

Attest:

GERALD J. MOSSINGHOFF

*Attesting Officer*  *Commissioner of Patents and Trademarks*